UNITED STATES PATENT OFFICE.

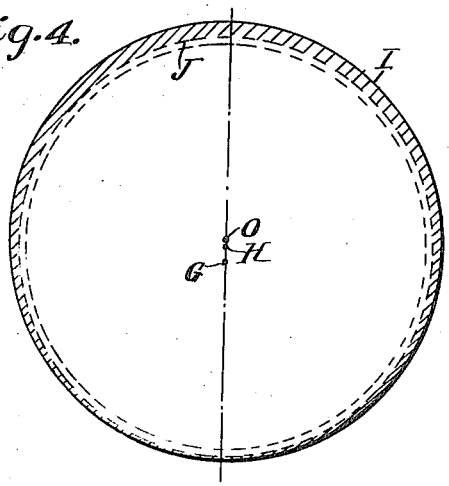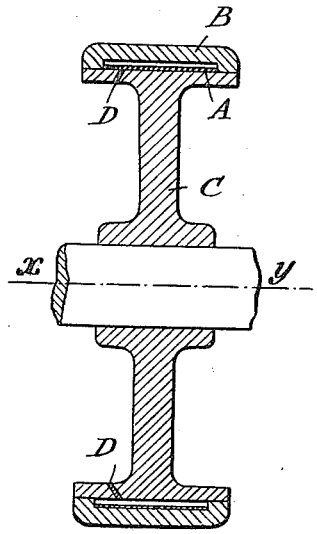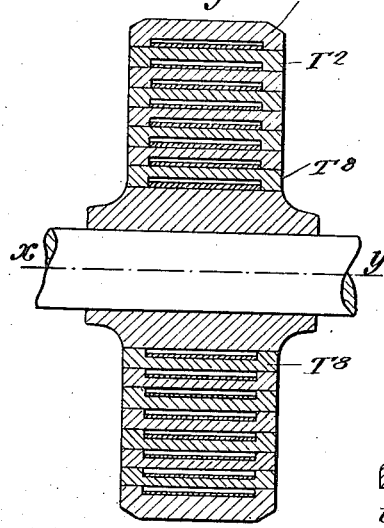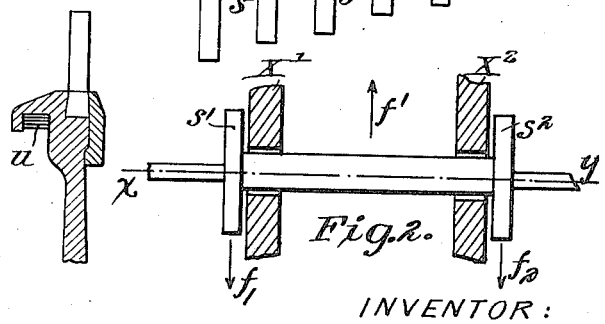

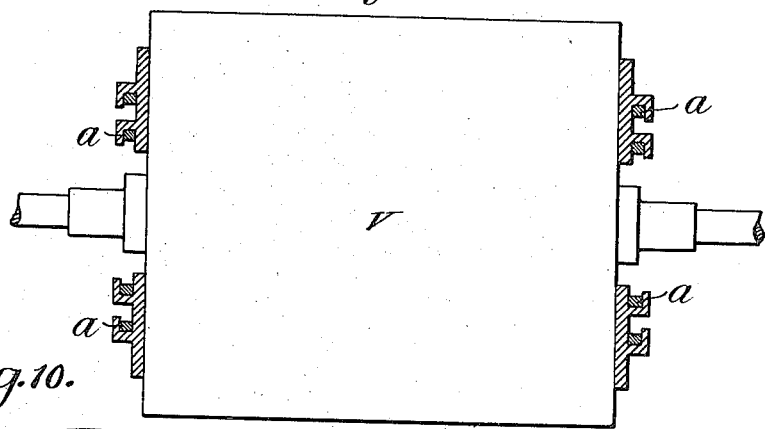
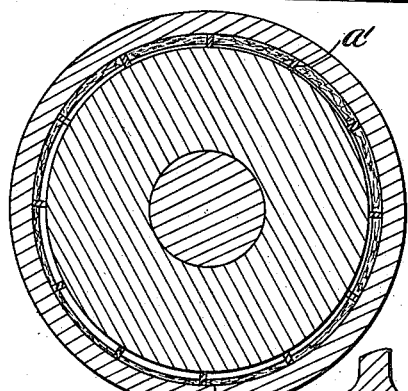
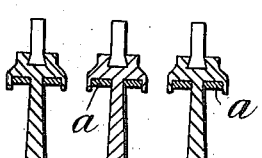
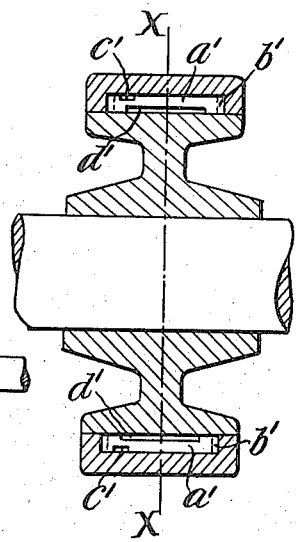
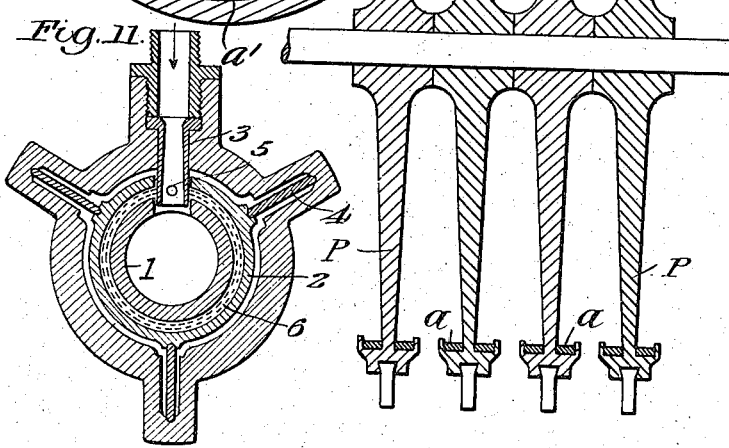

MAURICE LEBLANC, OF PARIS, FRANCE, ASSIGNOR TO SOCIÉTÉ ANONYME POUR L'EXPLOITATION DES PROCÉDÉS WESTINGHOUSE-LEBLANC, OF PARIS, FRANCE.

AUTOMATIC BALANCER FOR ROTATING BODIES.

1,209,730.          Specification of Letters Patent.      Patented Dec. 26, 1916.

Application filed July 23, 1912. Serial No. 711,177.

*To all whom it may concern:*

Be it known that I, MAURICE LEBLANC, a citizen of the Republic of France, residing in Paris, France, have invented certain new and useful Improvements in Automatic Balancers for Rotating Bodies, of which the following is a specification.

When it is required that a rotor should rotate very rapidly, it is necessary that its geometric axis should coincide very approximately with one of its principal axes of inertia through its center of gravity, which axis is called simply its axis of inertia in the following description. If this condition is not fulfilled, if the rotor shaft is rigid and its bearings fixed, the rotor rotates around its axis of symmetry, but exerts strong reactions on its points of support. If the rotor shaft is flexible and rests in fixed bearings, or if the shaft is rigid and the bearings movable, or if a combination of these two conditions occurs, the rotor instead of rotating around its geometric axis, rotates around its axis of inertia, or at least around an axis very near to the latter. In these conditions there is no strong reaction on the points of support, but the shaft "whirls" according to the ordinary expression, which consequently fatigues the parts attached to the rotating members. Also the rotor should generally rotate with a small amount of clearance within the stator; to avoid rubbing contacts, in spite of the whirling action, it is necessary to increase the clearance and this is often disadvantageous. The axis of inertia can be brought into coincidence with the geometric axis by attaching at the ends of the shaft two masses, the positions of whose centers of gravity are carefully arranged. Two additional masses are sufficient, but if a rotor comprises several wheels, it is preferable to first adjust the center of gravity of every wheel, so that it coincides with its geometric axis by means of an added mass and when the system has been mounted as a whole, to adjust the two end masses, in order to insure the coincidence of the axis of inertia with the geometric axis of the whole rotor. In this way the stresses exerted on the shaft during the rotation are reduced to a minimum. It is very difficult in practice to insure the coincidence of these axis, especially at very high speeds, and the equilibrium is destroyed if the rotor undergoes any deformation due to centrifugal forces during the rotation.

The automatic adjusters, which form the subject of the present invention, consist in added masses of a dense material the particles of which are mobile, disposed in concentric channels toward the periphery of a flywheel keyed to the rotor shaft and acted on by centrifugal force during the rotation. Such dense material may be a liquid, or very small steel balls or metal filings, both of which are mobile at practically all times; or it may be tin or a similar alloy which is mobile only at higher than ordinary temperatures, or a plastic material like cement which is mobile only while fresh. In the case of liquids or fine metal particles they retain their counterbalancing form only while the rotation continues; in the case of tin or cement or the like they assume a counterbalancing shape when first used and are then solidified or stiffened into that shape permanently. At the correct speed these mobile masses take up a position of equilibrium in which their center of gravity is so disposed relatively to the center of gravity of the rotor, that the geometric axis and the axis of inertia are brought into coincidence.

In the accompanying drawing, Figure 1 is a section of a balancer. Fig. 2 shows the arrangement of two balancers on the rotor shaft. Fig. 3 shows a rotor with several wheels each provided with a balancer. Fig. 4 is a diagrammatic section showing the position of the center of gravity of the liquid mass in relation to the center of gravity and to the center of figure of the rotor. Fig. 5 shows a modification of Fig. 1 in which the balancer is provided with several circular channels. Fig. 6 shows in section part of a turbine rotor provided with a groove in which one or more tubes partly full of liquid are placed. Figs. 7 and 8 show modified constructions in which the circular channels are open. Fig. 9 is an axial section, and Fig. 10 a transverse section on X—X (Fig. 9) showing a modification in which the channels are provided with baffle plates. Fig. 11 is a cross-section of a means for supporting the rotor.

Every balancer consists (Fig. 1) of a circular channel concentric with the geometric axis $x\,y$ of a rotor. The channel is disposed for example in a rim B, which is shrunk on the felly of a flywheel C keyed to the rotor shaft. A certain quantity of a liquid, mercury for instance, is introduced by the holes D, D and the channels are filled with a viscous substance, such as vaseline or some fatty matter, which serves to damp the movements of the mercury, and finally the holes are stopped.

The masses of the mercury balancers represent the added masses, whose centers of gravity can be displaced relatively to that of the rotor.

As at least two added masses are required to bring into coincidence the geometric axis and the axis of inertia of a rotor, at least two balancers $S^1$ and $S^2$, as shown in Fig. 2, must be keyed on the shaft.

If the rotor comprises several wheels $R^1$, $R^2$, $R^3$ (Fig. 3) it is advisable, if there is sufficient space, to provide the same number of separate balancers $S^1$, $S^2$, $S^3$, of which every one is coupled to a wheel, so that there is an added mass for every separate wheel, as stated above. Fig. 4, which shows diagrammatically the principle of action of the balancers, is a section at right angles to the axis of rotation of the balancer, through its center.

The points O, G and H are the traces on this plane respectively of the geometric axis $x$, $y$ of the rotor and of the balancer, of the axis of inertia of the rotating masses other than the mass of the mercury, and of the actual axis of rotation of the system. The circumference I represents the trace on the plane of Fig. 4 of the external surface of the circular channel of the balancer.

If we suppose the rotor to be provided with two balancers containing masses $m'$, $m^2$ of mercury, all the masses of the rotor other than the masses of the mercury could be represented by two masses $M'$ and $M^2$, of which the former has its center of gravity at the point G, and the latter at a corresponding point of the other balancer.

The free surface of the mercury, when rotating, will for each balancer, be a cylinder of revolution about the actual axis of rotation.

It may be assumed for the sake of simplicity, that the geometric axis, the axis of inertia and the actual axis of rotation remain parallel. This condition will always be very approximately fulfilled.

In the balancer represented in Fig. 4 the trace on the plane of the figure of the free surface of the mercury will be the circumference J of a circle, whose center is at H. The center of gravity G of the mass of the mercury will be eccentric as regards the point O, but on account of the symmetrical disposition of the parts, will be on the line O H produced. The points G and H will always be situated on opposite sides of the point O.

Since the rotor shaft can by hypothesis be freely displaced, the only forces applied to the rotor, which need be considered, are the centrifugal forces $F'$ and $F^2$ acting on the masses $M'$ and $M^2$, and the centrifugal forces $f'$ and $f^2$ acting on the masses $m'$ and $m^2$.

The parallel forces $F'$ and $f'$ will give rise to a single resultant force $R'$. Similarly the forces $F^2$ and $f^2$ will have a single resultant $R^2$.

When equilibrium is established, the resultants $R'$ and $R^2$ will each vanish, or otherwise they would give rise to a couple which would displace the rotor, relatively to the axis of rotation, so that the forces $F'$ and $f'$ will be equal and opposite, and the same will be true of the forces $F^2$ and $f^2$.

The force $F'$ acts in the direction GH, the force $f'$ in the direction HT. In order that these forces shall act in opposite directions it is necessary that the points T and G shall be in a straight line and that the point H shall be between G and T, the point O being situated, as previously mentioned, between the points H and T on the straight line HT, the point H lies necessarily between the points G and O on the straight line GO. Consequently the actual axis of rotation through the point H will be nearer the geometric axis through the point O, than the axis of inertia of the masses of the rotor, other than the masses of mercury, which passes through the point G.

The actual axis of rotation is simply the axis of inertia of all the rotating masses and thus the added masses of mercury take up automatically under the action of centrifugal forces positions, which tend to cause the axis of inertia of the system to coincide with the geometric axis. The apparatus acts consequently as an automatic balancer.

The restoring force exerted by a balancer is proportional to the external diameter of its circular channel, to the cross section of the channel and to the eccentricity OH, assuming that the mercury completely fills the cylinder forming the external periphery of the canal.

In practice the mercury ring may be of small width and the circular channel very shallow, since the eccentricity OH will always be very small, so that there is room to superpose a large number of circular channels, as shown in Fig. 5. The balancer shown in this figure consists of a series of rims $T_1$, $T_2$, shrunk over one another, when hot. The channels provided in these rims are partly filled with mercury and then completely filled with a viscous substance, as previously mentioned. Balancers of small volume and weight constructed in this way can exert very powerful forces tending to bring the axis of inertia and the geometric axis together, when there is even a very small want of coincidence between them.

The above described method of constructing the balancers is only given by way of example. Any construction of the balancers in which completely closed circular channels are formed is suitable. Also the mercury can be replaced by very small steel balls or metal filings.

It is useful to provide baffle plates in the circular channel as shown in Figs. 9 and 10 for the purpose of damping any oscillatory movements of the mercury, if it acquires any velocity relatively to the walls of the channels. For this purpose sheet iron plates $a^1$ are placed at equal intervals in grooves $b^1$ formed in the sides of the rim, which forms the external periphery of the channel (Fig. 10). In each plate there is a small opening $c^1$ near the external wall of the ring and another longer opening $d^1$ near the internal wall of the ring. The mercury flows from one compartment to another through the openings $c^1$ to take up its surface of equilibrium. The air or viscous liquid which fills up the compartment escapes by the openings $d^1$.

The smaller the openings $c^1$ the more damped are the movements of the mercury in relation to the channels. At the same time if the section is too much reduced, the sensitiveness of the apparatus would be diminished in case of accident, since the flow of mercury from one position of equilibrium to another might take too long.

It is necessary to take into consideration the effects due to capillarity and surface tension. There should be sufficient mercury in each compartment to cover the small openings $c^1$. If one compartment were full and an adjacent compartment empty, the mercury in flowing from the former to the latter through a very small hole, would meet with a very large resistance due to capillarity. To overcome this considerable pressure must be developed by centrifugal force at the position of the opening and this requires a high speed in the balancer. Until this occurs the action may be very irregular. This drawback can be avoided with certainty, if there is sufficient mercury to fill all the compartments but one. It is also necessary that the minimum thickness of the mercury ring when it has been displaced by the rotation, so that the axis of the free surface does not coincide with the geometric axis, should not be too small, or otherwise the surface tension would prevent the mercury from taking up its position freely. For this reason it is convenient that the mercury should almost completely fill the ring, that is that the volume of the layer of air or oil on the surface of the mercury should be always small compared to the volume of the latter.

The specific construction shown in Figs. 9 and 10 is covered in a separate application, No. 803,970, filed December 1, 1913.

Fig. 6 represents by way of example part of the section of the rotor of a turbine, in the rim of which an annular groove $u$ is provided in which is placed one or more closed tubes partially filled with mercury. Instead of damping the movements of the mercury by vaseline, the mercury may be imprisoned in resin, which is solid at ordinary temperatures and which is heated to render it liquid. In this way the rotor may be balanced once for always, assuming the rotor not to be deformed by centrifugal force. This is done as follows:—The rotor provided with balancers constructed in this manner is mounted on a rigid shaft on bearings, which are light and capable of displacement, so as to allow the rotor to rotate about one of its principal axes of inertia passing through its center of gravity or at least very near to it, and the rotor is then caused to rotate at its normal speed. The balancers are then heated by a lamp so as to melt the resin, the mercury is displaced and takes up the position, which brings the rotor into equilibrium and maintains this position as long as the rotation continues. When the heat is no longer applied the resin cools and solidifies and again imprisons the mercury in the position it has assumed. The rotor might be heated immediately before it was set into rotation. The rotor remains balanced and if it is not deformed by the centrifugal force, it can be mounted on fixed bearings ready for work.

If it is not convenient to use mercury and a substance such as resin to imprison it, a simpler and more practical method consists in partly filling the circular channels with tin or an alloy still more fusible. This is melted just before starting, after the balancers have been mounted on movable bearings, as explained above. The alloy will be displaced in the channel, under the influence of the forces of inertia and will be solidified after accumulating at suitable parts. After it has had time to cool the rotor is stopped and will be balanced once for all. In this case the circular channels need not be completely closed, as they must be, if they contain mercury.

Figs. 7 and 8 illustrate these modifications. The channels are replaced by the circular grooves $a$, $a$ open externally and integral with a drum represented in section in Fig. 8. These grooves are cast with the supporting rings. They are thoroughly tinned, and are not heated until the rotor has attained speed and the latter is not stopped until the metal has again set. These grooves are placed on the sides of the rotor V, which may be of any construction.

If the rotor comprises several wheels, as shown in Fig. 7, it is advisable to provide all the wheels P with similar grooves $a$ to mount them provisionally on a special shaft and balance them separately. When the wheels are assembled, it is best to mount the rotor on special bearings and to complete the balancing, by heating the two end grooves, while the rotor is in rotation. In Fig. 8 it is assumed that there is only one groove on each of the faces of the wheels, there may be however several concentric grooves. Instead of a metal or alloy, which must be melted, any pasty cement can be used, which will set, while the rotor is in motion.

In order that the balancers can accomplish the required results, that is, bring into coincidence the axis of inertia and the geometric axis, it is necessary that the rotor should be able to select its axis of rotation at every instant as freely as possible, in order that the rotation should always take place, if not about the axis of inertia of all the moving parts, at least about an axis approximately very closely to it. This condition is absolutely indispensable. In the modifications shown in Figs. 7 and 8, it is necessary that the rotor should be mounted on a shaft in such a way, that it is free to select its axis of rotation during the process of balancing and before it is in working operation.

A transverse section of a suitable style of bearing for the rotor is shown in Fig. 11. The bearing ring for the shaft of the rotor is shown at 1. Around this is a ring 2 for limiting the lateral displacement of the bearing ring 1. A tube 3 penetrates the bearing 1 after passing through the limiting ring 2, which prevents these rings from turning relatively to each other, but permits a sufficient play between them to allow a slight relative movement up and down or to the right and left or a slight reciprocation in the axial direction. Normally the limiting ring 2 is held fixed by three radial plates 4. When the strains on the ring 2 exceed a certain limit, the plates 4 bend and permit a slight movement. Oil is passed through the tube 3 under pressure. A portion of the oil lubricates the shaft in the bearing ring 1. The remainder passes through the orifices, such as 5, into the space between the two rings 1 and 2. In order to damp the movements of the bearing ring 1 there are arranged between it and the inclosing ring 2, one or more very thin concentric rings, indicated in dotted lines at 6, and made of aluminum or celluloid or other suitable material.

If very powerful balancers are used there may not be room for fixing several and it may be necessary to use only two $S'$, $S^2$ at the ends of the shaft as shown in Fig. 2. These powerful balancers can not only correct errors of balance due to construction, but even those due to accidents, such as a broken set of blades in a turbine. In these circumstances the shaft may be exposed to a very considerable force at its center for instance and to two opposite forces at its ends due to the balancers; there would then be some danger of bending the shaft. In this case balancers sufficiently powerful to prevent any whirling of the shaft cannot be used. This danger is reduced by means of two fixed guard rings $X'$, $X^2$ (Fig. 2) or a larger number spread over the length of the shaft. If an accident occurs, the shaft will roll on these rings without damage until the machine is stopped. It is necessary consequently to avoid any contact between the shaft and its guard rings during the normal working, by making the clearance between the shaft and the rings greater than the total play of the shaft.

The use of a counterbalancing material, such as tin or cement, which is first used in such condition that its particles are mobile and assume a counterbalancing shape and which are afterward solidified into such shape permanently is not specifically claimed in the present application. But I am not to be understood as thereby waiving my right to claim the same in a separate application.

Having now described the nature of my said invention and the best means I know of carrying the same into practical effect, I claim:—

1. The combination with a rotor shaft which is adapted to be freely displaced so as to be capable of rotation about a principal axis of inertia through its center of gravity, of balancers comprising masses secured to the rotor shaft and having a circular channel for every balancer, a dense material the particles of which are mobile partly filling the said channels and a viscous liquid filling the spaces left in the channels.

2. The combination with a rotor shaft which is adapted to be freely displaced so as to be capable of rotation about a principal axis of inertia through its center of gravity, of balancers comprising masses secured to the rotor shaft and having a circular channel for every balancer, and a substance partly filling the said channels, which substance is liquid so as to assume a counterbalancing shape when in rotation.

3. The combination with a rotor shaft which is adapted to be freely displaced so as to be capable of rotation about a principal axis of inertia through its center of gravity, of balancers comprising masses secured to the rotor shaft and having a circular channel for every balancer, a dense material the particles of which are mobile partly filling the said channels and fixed guard rings surrounding the rotor shaft with a certain amount of clearance between the rings and the shaft.

In witness whereof, I have hereunto signed my name in the presence of two subscribing witnesses.

MAURICE LEBLANC.

Witnesses:
H. C. COXE,
GABRIEL BELLIARD.